United States Patent [19]
Dellanno

[11] Patent Number: 5,961,182
[45] Date of Patent: *Oct. 5, 1999

[54] ENERGY ABSORBING SUPPORT FOR VEHICULAR PASSENGERS

[76] Inventor: Ronald P. Dellanno, 40 Fox Run, North Caldwell, N.J. 07006

[*] Notice: This patent is subject to a terminal disclaimer.

[21] Appl. No.: 09/081,363

[22] Filed: May 19, 1998

Related U.S. Application Data

[62] Division of application No. 08/854,119, May 9, 1997, Pat. No. 5,769,489.

[51] Int. Cl.$^6$ .................................................. B60N 2/42
[52] U.S. Cl. ............................. 297/216.12; 297/216.14; 297/410
[58] Field of Search ..................... 297/216.14, 216.13, 297/216.12, 452.41, 452.55, 452.57, 452.65, DIG. 3, 410

[56] References Cited

U.S. PATENT DOCUMENTS

| | | | |
|---|---|---|---|
| 3,205,005 | 9/1965 | Brown | 297/410 X |
| 3,528,703 | 9/1970 | Ohta | 297/410 X |
| 5,011,225 | 4/1991 | Nemoto | 297/410 X |
| 5,181,763 | 1/1993 | Dellanno et al. | |
| 5,290,091 | 3/1994 | Dellanno et al. | |
| 5,529,377 | 6/1996 | Miller | 297/DIG. 3 X |
| 5,558,398 | 9/1996 | Santos | 297/DIG. 3 X |
| 5,580,124 | 12/1996 | Dellanno | |
| 5,669,661 | 9/1997 | Pajon | 297/216.4 X |
| 5,678,891 | 10/1997 | O'Neill et al. | 297/452.41 X |

FOREIGN PATENT DOCUMENTS

| | | | |
|---|---|---|---|
| 969083 | 6/1975 | Canada | 297/216.14 |
| 143353 | 6/1985 | European Pat. Off. | 297/216.14 |

*Primary Examiner*—Peter M. Cuomo
*Assistant Examiner*—David E. Allred
*Attorney, Agent, or Firm*—Klauber & Jackson

[57] ABSTRACT

Apparatus for preventing or limiting spinal injuries to a passenger seated in a forward facing position in a moving vehicle during vehicular impact or sudden deceleration. The apparatus includes a vehicle-installed supporting seat for the passenger, the seat having a support portion behind the seated passenger which includes a resilient surface in contact with the supported passenger. The resilient portion is supported on an underlying stiff support shell. The support shell is rearwardly displaceable upon being subjected to impressed forces generated from the passenger pressing against the resilient surface of the support portion as a result of a rear end impact at the vehicle. A controllably deformable energy absorbing crush zone is disposed to the rear of the shell as to be compressed by rearward displacement of the shell, whereby the support portion acts to decelerate the supported spine of the passenger during a vehicle rear end impact, while the controlled deformation of the crush zone absorbs energy, to prevent or limit spinal injuries to the passenger.

2 Claims, 4 Drawing Sheets

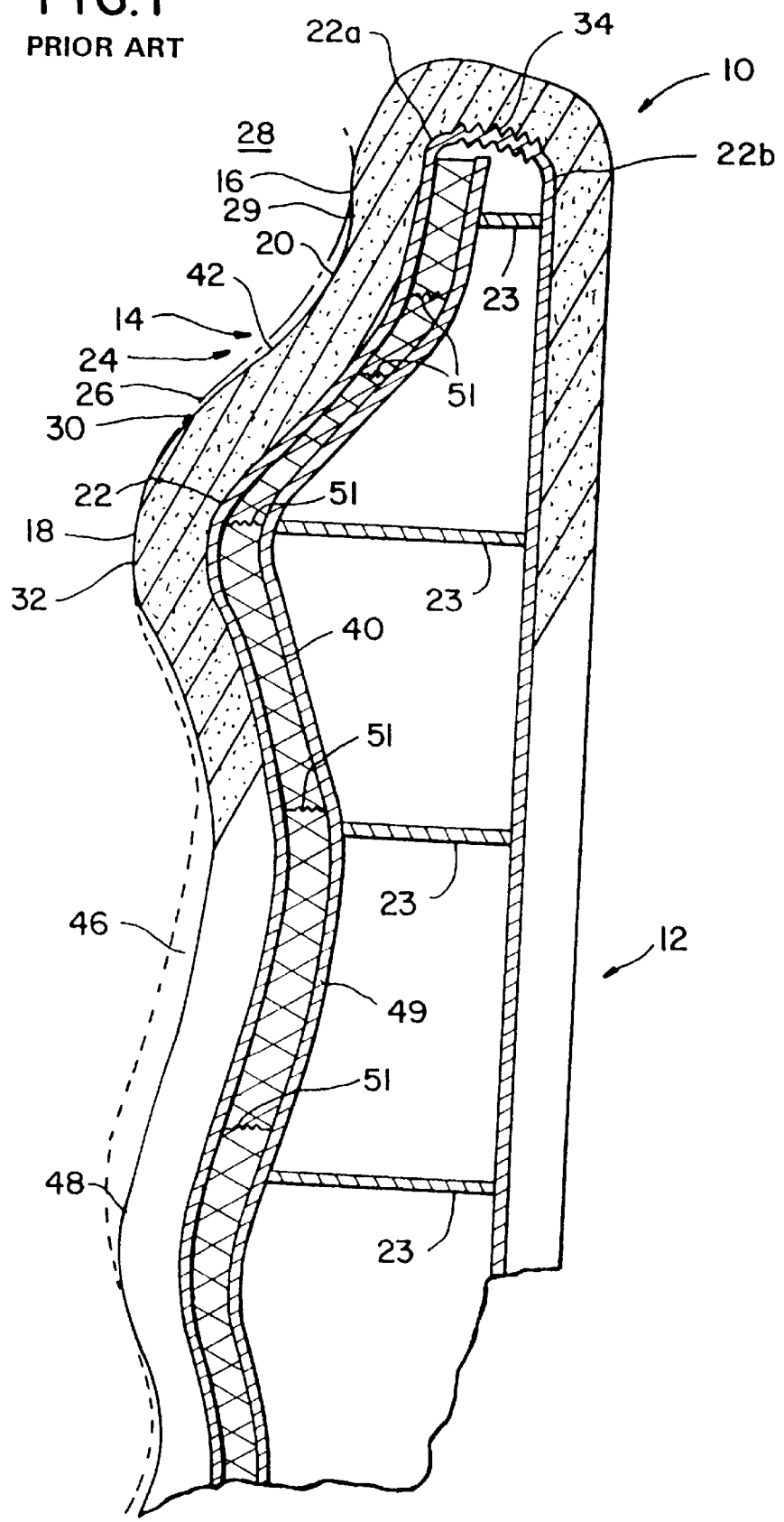

ENERGY ABSORBING SUPPORT FOR VEHICULAR PASSENGERS

This application is a Division of application Ser. No. 08/854,119, filed May 9, 1997 which issued as U.S. Pat. No. 5,769,489.

FIELD OF THE INVENTION

This invention relates generally to vehicular seating, and more specifically relates to seating apparatus for use in vehicles, which includes means which so interact with a seated passenger that the kinetic energy of the passenger is absorbed during sudden vehicle deceleration, whereby injury to the passenger's cranium, cervical, thoracic, and/or lumbar spine is prevented or minimized.

BACKGROUND OF INVENTION

Whiplash related injuries are caused by the rapid acceleration of a person's cranium and cervical spine, which occurs, for example, in a rear end automobile collision. The rapid acceleration causes the extension and flexion of the cervical spine which, in turn, can cause severe injury. Types of whiplash related injuries include fractured and/or dislocated vertebrae, torn ligaments (both anterior and posterior of the spinal column), and evulsion of parts of the vertebrae, ligaments and intervertebrae discs. Similar injuries can occur to the thoracic and lumbar spinal areas.

It has thus been found, for example, that the C4, C5 and C6 cervical vertebrae, and the paravertebrae ligaments are most often damaged with whiplash related injuries, although the entire cervical as well as the thoracic and lumbar spine may well be involved. Rapid extension of the cervical spine can thus stretch the anterior longitudinal ligament, thus placing it in traction and causing either bone or ligamentous damage. Such hyperextension typically damages the C1 through C7 cervical vertebrae. The vertebral artery, which extends through an opening in the cervical vertebrae, and the sympathetic nerve fibers that surround the artery are also often damaged. These types of injuries cause severe disabilities and, in some instances, death.

Seatbacks and/or head restraints in automobiles, trucks, and other types of vehicles are provided to prevent whiplash related injuries to passengers during collisions, but typically fail. During a rear-end vehicle collision, the forces of the collision typically cause a passengers's cranium and cervical spine to rapidly accelerate toward the rear of the vehicle. Once the cranium strikes the seatback or head restraint, it then rapidly accelerates in the opposite direction toward the front of the vehicle. The rearward acceleration of the cranium, and resulting collision with the seatback or head restraint, causes injury of the cervical spine and, thus typically injuries the anterior structure of the passenger's neck. The forward acceleration of the cranium, on the other hand, causes hyperflexion of the cervical spine and typically the posterior structure of the neck.

In my issued U.S. Pat. Nos. 5,181,763 and 5,290,091, the entire disclosures of which are hereby incorporated by reference, apparatus is disclosed for preventing whiplash-related injuries to a passenger in a vehicle. The characteristic shapes of the devices shown therein define a supporting means and contour located behind the cranium and cervical spine of the passenger that interfit with the posterior contour of the passenger's cranium and cervical spine. The supporting means interacts with the passenger during rear end impact to maintain the pre-collision shape of the supported spinal zones, to thereby aid in the avoidance of whiplash and similar injuries.

It may be noted in the foregoing discussions, that the construction of most prior art seatbacks and head restraints incorporate materials that in an effort to provide maximum comfort, are highly resilient. Such materials while they may absorb some of the impact energy which is generated as the passenger is thrown rearwardly against the seat during a rear end impact, promptly transfer the absorbed energy back to the passenger, causing a rebound effect, which only adds to the detrimental conditions which foster injury.

In accordance with the foregoing, it may be regarded as an object of the present invention, to overcome the problems and disadvantages of known apparatus for preventing whiplash, such as vehicle head restraints and seatbacks.

It is a further object of the present invention, to provide apparatus of the foregoing type, which includes means for efficiently and safely absorbing impact energy, thereby further diminishing the likelihood of passenger injury.

In my further issued U.S. Pat. No. 5,580,124 (the entire disclosure of which is hereby incorporated by reference) there is disclosed a vehicle-installed supporting seat for a passenger, which includes a seat back provided with an integral head-neck restraint comprising a cranium support portion and a cervical spine support portion. Each said portion includes a layer of resilient material supported on an underlying inflexible support shell, which together act to effectively define a contour that interfits with the posterior contour of the passenger's cranium and cervical spine. The support shell is rearwardly displaceable upon being subjected to impressed forces generated from the passenger pressing against the restraint as a result of a rear end impact at said vehicle. A controllably deformable energy absorbing crush zone is disposed to the rear of the shell as to be compressed by the rearward displacement of the shell. The interfitting contour and thereby the inflexible shell, upon being displaced by said forces toward the underlying crush zone, retain the shape of the contour, whereby the cervical and cranium support portions act to substantially simultaneously decelerate the cranium and cervical spine of the passenger during a vehicle rear end impact, while the controlled deformation of the crush zone absorbs energy, to prevent whiplash-related injuries to the passenger.

The apparatus of the U.S. Pat. No. 5,580,124 patent preferably further includes a thoracic and lumbar spine support portion which are defined by downward extension of the support shell, resilient material and contour; whereby the thoracic and lumbar spine portion of the passenger are decelerated with the cranium and cervical spine during a rear end impact.

The thoracic section of the human spine is believed to be compressed and flattened during a rear end impact. In addition to being injured, this flattening of the thoracic spine causes axial loading into the cervical spine as the weight of the head and upward pressure of the flattening thoracic spine serve as end point forces to damage the cervical spine. Where present, the thoracic portion of the above seat serves to prevent the flattening of the thoracic spine by having a kyphotic or concave firm contoured shell that takes the shape of the human thoracic spine and maintains this shape during rear end impact. This form contoured shell precedes the crush zone material which plastically deforms and produces a controlled damping of the forces incurred during a rear end collision.

The lumbar section of the seat will conform to the lumbar spinal curves of the human anatomy. The initial foam that contacts the occupants is combined with the crush zone feature to maximize the energy absorbing feature of this technology.

This firm contoured shell will hold its form on impact from the rear end collision. This contoured shell will then plastically deform the crush zone material. The function of the crush zone, whatever materials are used, is to initiate a controlled damping of forces that result in little or no rebound energy to the occupant.

The crush zone may comprise one or more air bladders, and valve means responsive to rear end vehicular impact to the one or more bladders to at least partially deflate. The inflexible shell can, for example, be linked to one or more mechanical actuators which open the valves upon a predetermined displacement of the shell; or one or more sensors can upon detecting a rear end impact, actuate the valves to enable controlled deflation of the air bladders.

Similarly, one or more rear impact sensors can enable control signals upon an impact of sufficient magnitude, which signal disables a restraint means, e.g. by releasing a mechanical stop which otherwise prevents displacement of the inflexible shell (or of a plate linked to the shell) against or into the crush zone.

In another aspect of the U.S. Pat No. 5,580,124 disclosure, the crush zone can comprise an impact collapsible cellular structure, such as a frangible foam. In still a further aspect, the crush zone may comprise an elastically deformable material which absorbs energy at a substantially more rapid than it releases same.

The crush zone may be sandwiched between the inflexible shell and a spaced fixed, rigid plate; or the crush zone can be spaced from the rear of the shell and contacted and compressed by an intermediate plate which is linked for displacement with the shell. Rearward displacement of the shell may be resisted by restraining means adapted to collapse at a preset strain.

SUMMARY OF THE INVENTION

Now in accordance with the present invention, it has been found that the energy absorbing concepts of my U.S. Pat. No. 5,580,124 patent, can be incorporated into a vehicular passenger support in a manner that will independently or conjunctively protect any or all of the passengers' cranium, cervical, thoracic, and/or lumbar spine. Pursuant to the invention, apparatus is thus provided for preventing or limiting spinal injuries to a passenger seated in a forward facing position in a moving vehicle during vehicular impact or sudden deceleration. The apparatus comprises a vehicle-installed supporting seat for the passenger, the seat having a support portion behind the seated passenger which includes a resilient surface in contact with the supported passenger, the resilient portion being supported on an underlying stiff support shell. The support shell is rearwardly displaceable upon being subjected to impressed forces generated from the passenger pressing against the resilient surface of the support portion as a result of a rear end impact at the vehicle. A controllably deformable energy absorbing crush zone is disposed to the rear of the shell as to be compressed by the rearward displacement of the shell, whereby the support portion acts to decelerate the supported spinal curves of the passenger during a vehicle rear end impact, while the controlled deformation of the crush zone absorbs energy, to prevent or limit spinal injuries to the passenger.

The support portion can be provided at a portion of the seat which lies behind the thoracic spine of a seated passenger, and/or at a portion of the seat that lies behind the lumbar spine of a seated passenger; and/or at a portion of the seat which lies behind the cranium and cervical spine of a seated passenger.

The resilient surface may conform to the shape of the spine of the seated passenger. The surface may be preformed to this shape, or may comprise of a foam, gel or other material which molds to the contacting body contour of the passenger upon the passenger being seated, and returns to its original shape when the seat is vacated. Materials of this type made of a high density, visco-elastic open-cell material, are available commercially from Tempur-Pedic of Lexington, Ky., and have been used in pillows and mattresses.

The crush zone may comprises one or more air bladders, and valve means responsive to an impact may function to enable the one or more bladders to at least partially deflate upon vehicular impact. The crush zone may also comprise an impact collapsible cellular structure. In another embodiment the crush zone may comprise an elastically deformable material which absorbs energy at a substantially more rapid rate than it releases same. The crush zone can be sandwiched between the stiff shell and a spaced fixed, rigid plate, or can be spaced from the rear of the shell and contacted and compressed by an intermediate plate which is linked for displacement with the shell. Rearward displacement of the shell can be resisted by restraining means adapted to collapse at a present strain.

BRIEF DESCRIPTION OF THE DRAWINGS

In the drawings appended hereto:

FIG. 1 is a simplified, schematic cross-section illustrating the prior art apparatus disclosed in U.S. Pat. No. 5,580,124;

DESCRIPTION OF PREFERRED EMBODIMENTS

Figure 3:
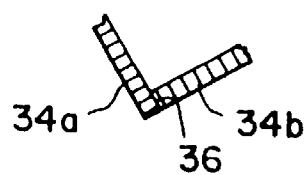
FIG. 3 depicts an enlarged cross-section of a portion of the FIG. 1 apparatus, and illustrates an arrangement enabling rearward displacement of the inflexible shell to occur at a pre-set force level.

In FIG. 1, a cross-sectional view, schematic in nature, appears through prior art apparatus 10 in accordance with the disclosure of U.S. Pat. No. 5,580,124.

The vehicle-installed supporting seat for the passenger includes a conventional seating area, which is not shown in the drawing. Extending in a vertically upward direction from the seating area is seat back 12 provided with an integral head-neck restraint 14 comprising a cranium support portion 16 and a cervical spine support portion 18. Each said portion includes a layer of resilient material 20 supported on an underlying inflexible support shell 22. The material 20 and the shell 22 together act to effectively define a contour 24 that interfits with the posterior contour 26 of the passenger 28's cranium and cervical spine. This contour 26 thus presents a first surface 29 located behind the passenger's cranium for contacting the approximate center of mass of the cranium and supporting the approximate central posterior area of the passenger's cranium, and a second surface 30 located below the first surface and defining a substantially convex smooth curve, the maximum protrusion point 32 of which projects anteriorly relative to where the first surface 29 contacts the center of mass of the passenger's cranium, the said second surface 30 thereby contacting and supporting the posterior portion of the passenger's cervical spine substantially simultaneously with the said contact of the passenger's cranium with said first surface.

The support shell 22 may comprise a hard relatively inflexible plastic, or similarly may comprise metal or the like. Pursuant to the present invention, the shell may also comprises a relatively rigid foam, one which has high stiffness characteristics, so that such material, as with a inflexible plastic, will maintain the spinal contours under impact loading. Shell 22 is rearwardly displaceable upon being subjected to impressed forces generated from the passenger 28 pressing against the restraint as a result of a rear end impact at the vehicle. In the embodiment shown in FIG. 1 this is enabled by having the shell 22 formed as a front piece 22a and a rear piece 22b, the two pieces being interconnected by one or more flexible accordion pleats, the uppermost of which appears at 34. In another embodiment of the device illustrated, the pleats 34 can instead of being entirely flexible, be formed of rigid interconnected units as shown in the enlarged partial view of FIG. 3. In this arrangement, the elements 34a and 34b are disposed to shear from one another at point 36 upon a preset force level being attained, whereby rearward displacement of shell 22 only can occur when impact forces are sufficient to cause the said shearing. Other flexible mechanical links or compressible connections can also be used to permit the rearward displacement of shell 22 against the crush zone.

A controllably deformable energy absorbing crush zone 40 is disposed to the rear of the shell 22 as to be compressed by the rearward displacement of the shell. The interfitting contour 24 and thereby the inflexible shell 22, upon being displaced by said forces toward the underlying crush zone 40, retain the shape of the contour 24, whereby the cervical and cranium support portions act to substantially simultaneously decelerate the cranium and cervical spine of the passenger during a vehicle rear end impact, while the controlled deformation of the crush zone absorbs energy, to prevent whiplash-related injuries to the passenger.

The second surface 30 of contour 24 is smoothly joined to the first surface 29 by a transition surface 42 of said contour, which extends anteriorly at an obtuse angle from said first surface, and which is located to support the passenger's posterior area approximately where the cranium meets the cervical spine. The maximum protrusion point 32 of said second surface 30 projects anteriorly relative to said flat portion of said first surface 29 a distance of 1 to 6 inches, and the maximum protrusion point 32 is from 3 to 9 inches below the cranium contact zone.

The apparatus 10 of the invention preferably further includes thoracic and lumbar spine support portions 46 and 48, which are defined by downward extension of the support shell 22, resilient material 20 and contour 24; whereby the thoracic and lumbar spine portions of the passenger 28 are decelerated with the cranium and cervical spine during a rear end impact.

Figure 2:
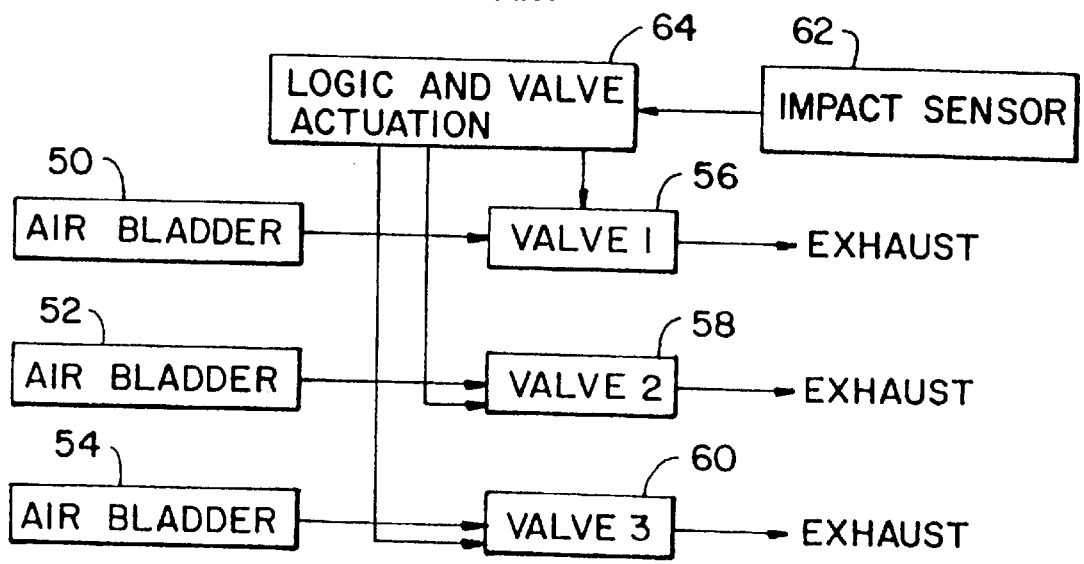
FIG. 2 is a prior art schematic block diagram illustrating use of an impact sensor to enable controlled collapse of a series of air bladders where the latter comprise the crush zone.

The crush zone 40 may comprise one or more air bladders, and valve means responsive to rear end vehicular impact to enable the one or more bladders to at least partially deflate. One such arrangement enabling this is shown schematically in FIG. 2. Illustratively three air bladders 50, 52 and 54 are shown, which may be disposed in side by side relation as crush zone 40. Each of the air bladders may be vented to atmosphere by respective normally closed valves 56, 58, and 60, which can be solenoid actuated. An impact sensor 62 is mounted to the vehicle and the signal output from same is provided to logic and valve actuator means 64. In the event that the output signal from sensor 62 exceeds a predetermined threshold level, control signals are provided to valves 56, 58, and 60, causing same to open and permit rapid but controlled deflation of the air bladders. Thus the crush zone is responsive to a rear end impact exceeding a predetermined level, and under such conditions acts to absorb energy as the shell 22 is displaced toward the crush zone. In another embodiment, the inflexible shell can be linked to one or more mechanical actuators which open the valves upon a predetermined displacement of the shell.

The crush zone 40 can also comprise an impact collapsible cellular structure, such as a frangible foam. The cellular structure can similarly comprise the well known bubble packing, which is commonly used to protect fragile objects during shipping. Other controllably collapsible or deformable materials can be used for crush zone 40, for example frangible ceramic or organic foams, or the like. The important consideration is that any such materials shall collapse or deform under suitable imposed forces in a controllable fashion so that they not only enable controlled rearward displacement of piece 22a, but also absorb energy in doing so. Thus by way of example, it will be clear that the bubble type packing material referred to absorbs energy during collapse as each of the cells is ruptured due to pressure forces.

In still a further aspect, the crush zone 40 may comprise an elastically deformable material which absorbs energy at a substantially more rapid rate than it releases same.

Figure 4:
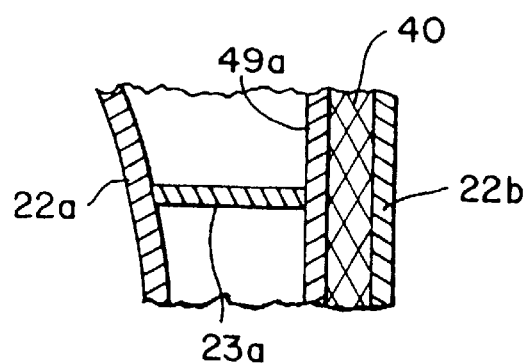
FIG. 4 is a partial cross sectional view, similar to FIG. 1, but showing an arrangement wherein the crush zone is formed toward the rear of the seat back.

The crush zone 40 may as shown in FIG. 1 be sandwiched between the inflexible shell 22 (via piece 22a) and a spaced fixed, rigid plate 49, which is maintained in its position by support members 23 which extend between plate 49 and back piece 22b. Compression springs 51 may be provided between shell 22 and plate 49 to aid in restoring the original spacing following the controlled collapse of the crush zone. In the variation shown in the partial cross section of FIG. 4, the crush zone 40 is placed to the rear of seat back 12. Here the rearward displacement of piece 22a moves plate 49a which is rigidly linked to piece 22a by members 23a.

Figure 5:
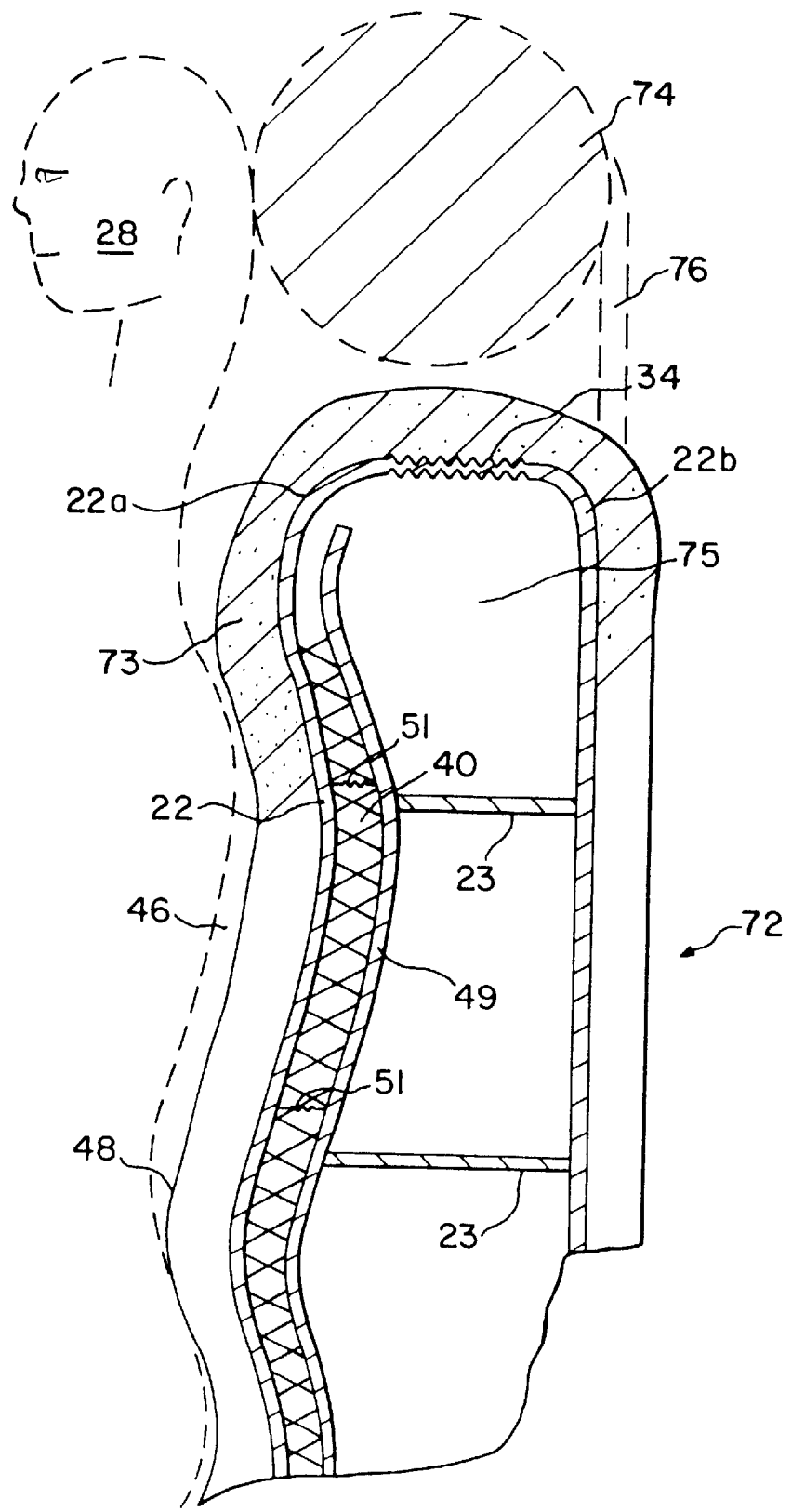
FIG. 5 is a simplified, schematic cross-section, illustrating a vehicular seat back in accordance with the invention, which is used in combination with a conventional head restraint.

In FIG. 5 a seat back 72 is shown in simplified schematic cross section, which is in accord with the present invention. The seat back 72 differs from the apparatus of FIG. 1 especially in that it is not associated with an integral upwardly extending portion for supporting the cranium and cervical spine, as is the device of FIG. 1. Thus the seat back 72 is designed function as an independent device which protects the thoracic and/or lumbar portions of the spine of a passenger 28 who is seated in contact therewith (as is the case for the earlier Figures, the horizontally extending support for the passenger 28 is not shown in the present Figure.) The seat back 72 is in the present instance associated with a head restraint 74 which is secured to seat back 72 by a bracket 76 which is as known in the art can be adjustably received in the seat back as to enable its height to be adjusted to the comfort of a given passenger. Head restraint 74 can be of completely conventional construction, or can in the alternative incorporate features of the invention, as will be discussed in connection with FIG. 6.

The various components of seat back 72 are identified by reference numerals which correspond to similar parts in the device of FIG. 1, and the seat back functions to protect passenger 18 in the manner that has been described for FIG. 1. The crush zone 40 may comprise the same materials as has been described in connection with FIG. 1, and the same systems and structures as are disclosed in FIGS. 2, 3, and 4 may be used with the seat back 72 of FIG. 5. The resilient surface 73 against which the passenger resides, can comprise any of the materials previously discussed; and may further usefully comprise a moldable gel-like material which under pressure of the seated passenger conforms to the contacting contour of the passenger. Although crush zone 40 is shown to be sandwiched between shell 22 and a plate 49 which has a curvature similar to that of shell 22, plate 49 can also be a flat surface spaced from shell 22b with the intervening crush zone. In fact in yet a further embodiment of the invention, the plate 49 and its supports 23 can be eliminated and the entire interior volume 75 filled with suitable material to comprise the crush zone.

Figure 6:
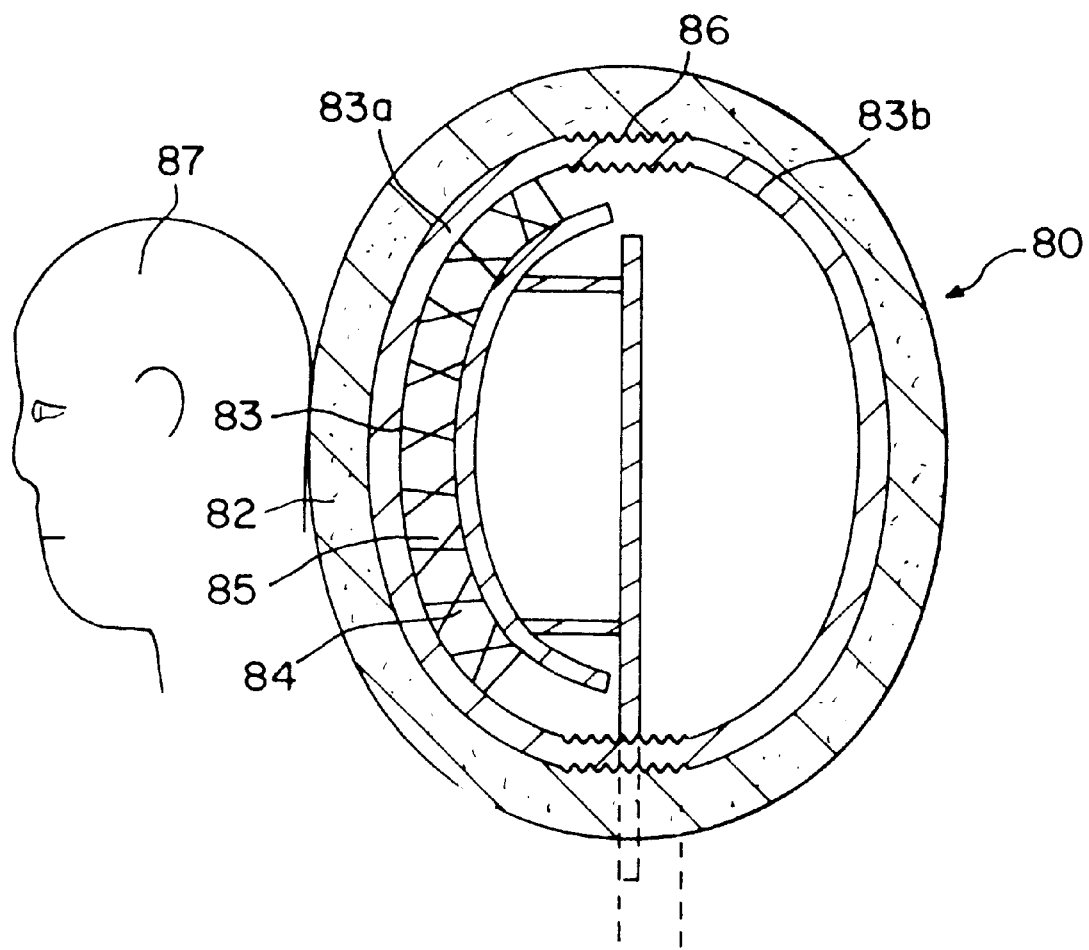
FIG. 6 is a simplified, schematic cross-section, illustrating a vehicular head restraint which incorporates principles of the invention.

In a further aspect of the invention, a conventionally shaped head restraint such as that illustrated in schematic cross section in FIG. 6, can incorporate the principles of the invention. Externally head restraint 80 thus has a configuration which is entirely conventional, i.e. it does not incorporate the characteristic cranium and cervical spine supporting shape of my prior referenced patents. However the otherwise conventional head restraint is seen to be provided with a resilient support surface 82, an underlying inflexible shell 83, a crush zone 85, and a spaced rigid plate 84 fixed to a frame portion of said head restraint, all of which function exactly has been discussed in connection with the prior embodiments. The shell 83 thus includes the two portions 83a and 83b, with intervening flexible portion 86, whereby upon the passenger's cranium 87 being forced against the head restraint 80 as a result e.g. of a rear end vehicular impact, shell portion 83 is displaced to the left (in the sense of the drawing) against the crush zone 85, which controllably deforms in the manner that has been previously discussed.

Since the head restraint does not have to maintain a specific shape to conform to the passenger's spine, it will be evident that it is also within the invention for the head restraint to function effectively to limit forces producing head injury, by including merely an outer passenger containing surface of a foam or other known materials used in the prior art, which surface overlies a controllably collapsible crush zone which the said surface can be displaced against under impact forces. The crush zone can be of the types discussed herein or can comprise other controllably collapsible materials which act to dampen the impressed forces.

In order to accurately accommodate different passengers, the head restraints 74 or 80 of FIGS. 5 and 6 can also be provided with means to enable adjustment of their position horizontally toward or away from the seated passenger, and/or vertically with respect to the vehicle and seated passenger. A mechanism as disclosed in FIG. 8 of my U.S. Pat. No. 5,290,091 (there to displace body 230) can be used with the present head restraints. A pair of servomotors controlled by suitable logic is coupled to the head restraint to enable the latter to move in the up and down vertical direction and in the horizontal direction. Simple rack and pinion arrangements can be used for these purposes. It will be evident to those skilled in the art that memory settings can be provided at the logic to enable passengers to preset the position of the head restraint to enable accurate interfit with each passenger using the vehicle in which the head restraint is installed.

While the present invention has been particularly described in terms of specific embodiments thereof, it will be understood that numerous variations upon the invention are now enabled to those skilled in the art, which variations yet reside within the scope of the present teaching. Accordingly, the invention is to be broadly construed and limited only by the scope and spirit of the claims now appended hereto.

What is claimed is:

1. Apparatus for preventing or limiting head injuries to a passenger seated in a forward facing position in a moving vehicle during vehicular impact or sudden deceleration, said apparatus comprising:

a vehicular head restraint for said passenger, said head restraint having a resilient support portion behind a cranium of the seated passenger which includes a resilient surface adapted to be in contact with the cranium of the passenger, and resilient portion being supported on an underlying inflexible support shell;

said support shell being rearwardly displaceably abutted with a crush zone for displacement upon being subjected to impressed forces generated from the head of said passenger pressing against the resilient surface of the support portion as a result of a rear end impact at said vehicle; and a rigid plate fixed to a frame portion of said head restraint in spaced relation to a rear surface of said support shell, said crush zone comprising a controllably deformable energy absorbing crush zone being disposed between said support shell and said rigid plate, said crush zone being compressed by said rearward displacement of the shell upon said impact or sudden deceleration; whereby said support portion acts to decelerate the cranium of the passenger during a vehicle rear end impact, while the controlled deformation of said crush zone absorbs energy, to prevent or limit head injuries to the passenger.

2. A head restraint in accordance with claim 1, including means for displacing said head restraint to accurately position said head restraint in proximity to the cranium of different passengers.

* * * * *